Figure 1:
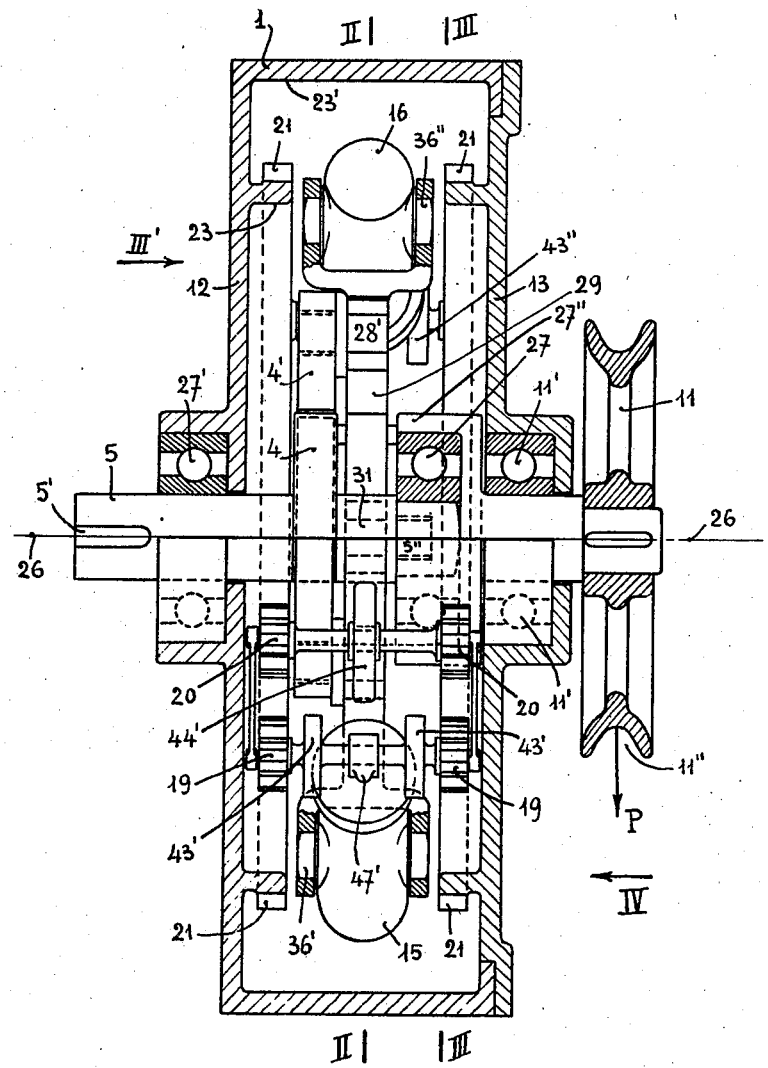

March 5, 1935.   C. FONTANA   1,993,476
REDUCTION GEAR FOR THE REDUCTION RATIO WITH AUTOMATIC VARIATION
Filed Sept. 25, 1933   7 Sheets-Sheet 1

Fig:1.

Inventor:
C. Fontana
By Glascock Downing & Seebold
Attorney

March 5, 1935. C. FONTANA 1,993,476
REDUCTION GEAR FOR THE REDUCTION RATIO WITH AUTOMATIC VARIATION
Filed Sept. 25, 1933 7 Sheets-Sheet 3

Inventor:
C. Fontana

By Glascock Downing & Seebold
Attorneys.

March 5, 1935. C. FONTANA 1,993,476
REDUCTION GEAR FOR THE REDUCTION RATIO WITH AUTOMATIC VARIATION
Filed Sept. 25, 1933 7 Sheets-Sheet 4
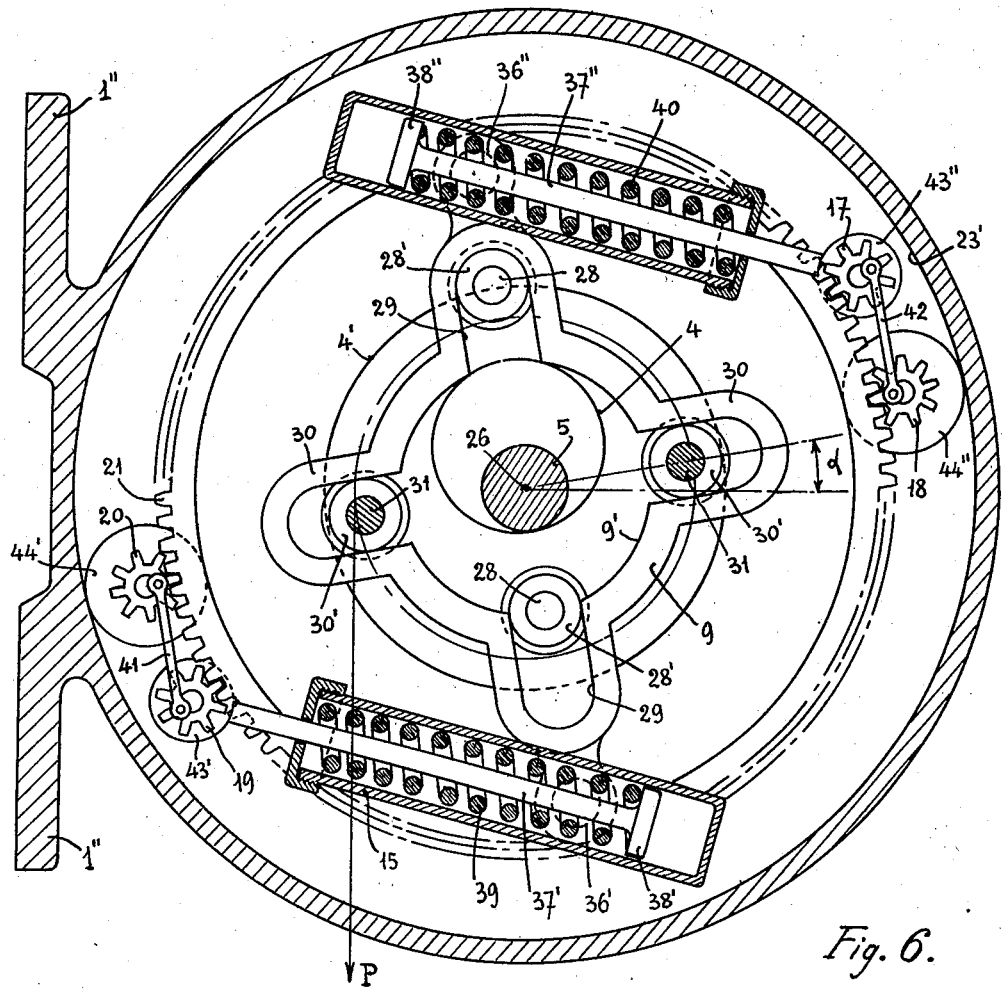
Fig. 6.
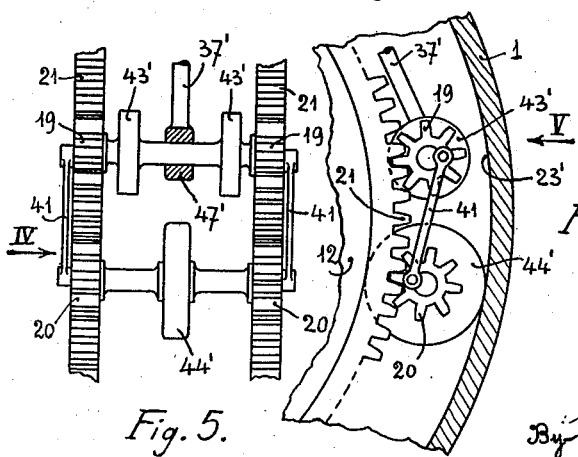
Fig. 4.
Fig. 5.
Inventor
C. Fontana
By Glascock Downing & Seebold
Attorney March 5, 1935.   C. FONTANA   1,993,476
REDUCTION GEAR FOR THE REDUCTION RATIO WITH AUTOMATIC VARIATION
Filed Sept. 25, 1933   7 Sheets-Sheet 5
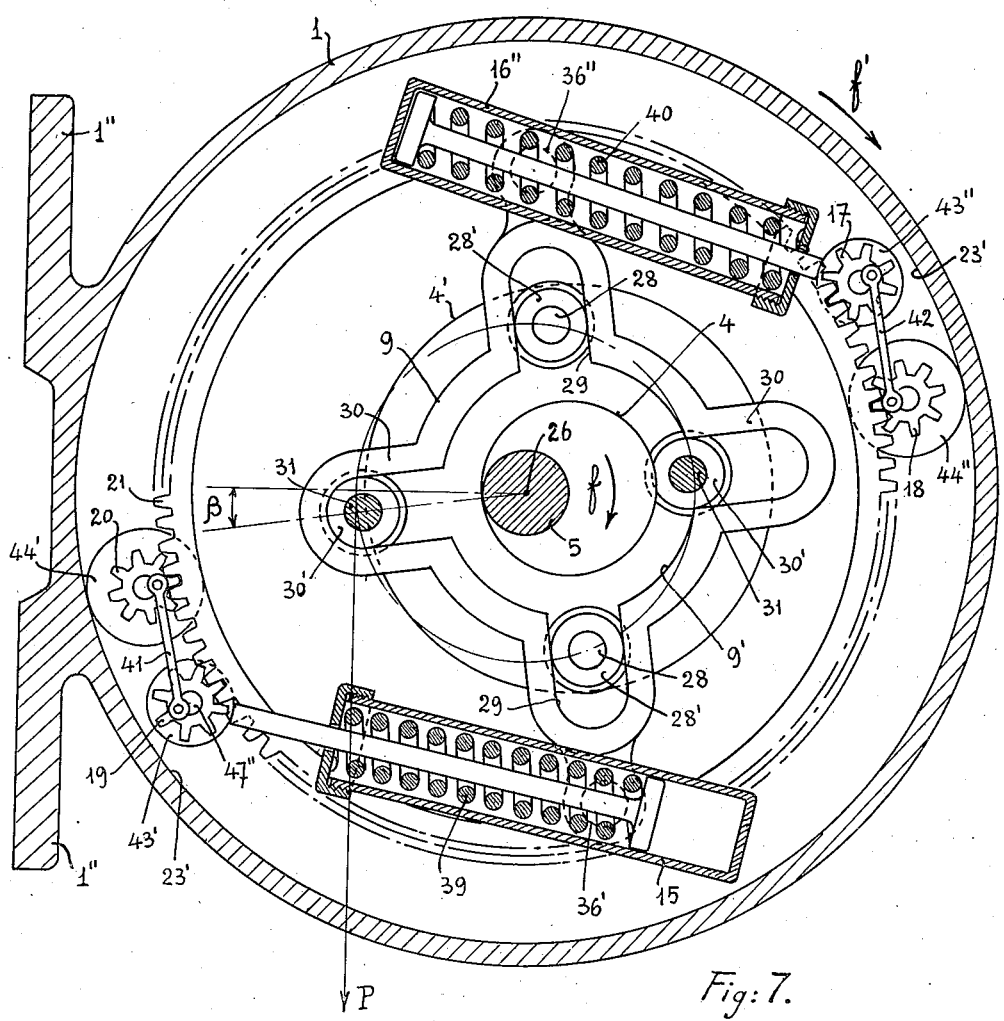
Fig: 7.
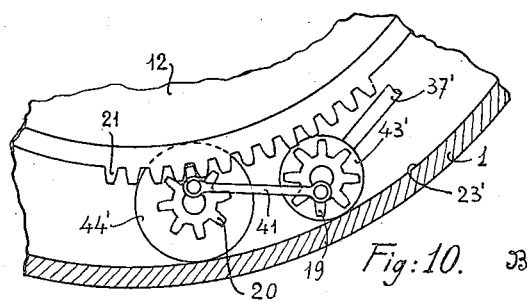
Fig: 10.
Inventor
C. Fontana
By Glascock Downing & Seebold
Attorneys Patented Mar. 5, 1935

1,993,476

UNITED STATES PATENT OFFICE 1,993,476

REDUCTION GEAR FOR THE REDUCTION RATIO WITH AUTOMATIC VARIATION

Cesare Fontana, La Spezia, Italy

Application September 25, 1933, Serial No. 690,924
In Italy September 30, 1932

5 Claims. (Cl. 74—259)

The present invention relates to a device destined to be interposed between a driving member and a resistant member, and to transmit the motion from the former to the latter with a ratio of reduction (of speed) automatically variable in relation to the variations presented by the resistance.

On account of said circumspections of use and constitution, or of use and constitution together, or on account of the combination with other means already known, such a device also finds different applications, as hereinafter specified.

The fundamental object of the present invention is realized through the combination of the following members and devices:

A driving member revolving in any way (either with continuity, or periodically or with reciprocating motion) around a geometrical axis;

An eccentric device (either eccentric disc, or eccentric plate and collar, crank handle and crank pin, articulated system, etc.) mounted on said driving member;

An intermediary oscillating member, actuated by the eccentric device but submitted to such restrictions that allow it to only accomplish alternate motions (linear or pendular oscillations, motions, or the like);

Limiting elements, such as guides and pins or sliders, etc. which reduce the freedom of motion of the intermediary oscillating movable member;

An intermediary monodirectional device (i. e. a device adapted to transmit the motion in a sole direction) of any type whatever (such as, a clawing means, a pawl and tooth gearing, a lever system and friction cheeks, an electromagnetically operated system, etc.) one of the parts of said monodirectional device being operated by or meshing with the intermediary oscillating movable member, and the other part meshing with or being actuated by the members that precede or follow it in the cinematic chain;

Any elastic member or means whatever, preferably adjustable (with springs, air cushion, etc.) interposed between said monodirectional device and the other members of the kinematic chain;

A driven member suitably connected to one of the parts of the monodirectional device above-mentioned (or to members operated by the latter) and that, by means of said device, can be caused to rotate only in a determined direction;

Eventually also other driven members to be utilized simultaneously or not with the previous one, that in one case can be operated directly and in another case can be bound by the action of the said monodirectional device; in the first case such further driven member has, like the preceding, a sole possible direction of rotation, while in the second case, said further driven member can be rotated, at will, in either direction or left immovable, while permitting the operation of the other parts of the device; and finally:

A locking means (that can be constituted by the same monodirectional device aforesaid) adapted to prevent the rearward motion of the driven member in those moments where the device does not act on the driven member for transmitting the motion thereto.

The resilient member or means aforesaid is in its turn characterized in that it is so constituted and arranged as to set up the following conditions:

The applied loads cannot thoroughly exploit the elasticity of the resilient member of means, owing to the arrangement and the proportion of the said intermediate oscillating device (in the case, for instance, of a spring that shall work by compression, such a spring cannot be compressed to such an extent as to bring its coils into contact with each other);

The moment of rotation that the reduction gear transmits from the driving member to the resistant one, sets up, initially, an ever-increasing compression of the resilient means, until one of the following conditions is taking place:

(a) The balance between the moment, relatively to the axis of rotation, of the reaction of the resilient means and the actual value of the resistant moment developed by the resistant member, takes place, owing to the proportions of the various parts, ere the maximum deformation is attained whereto the said interposed resilient means can be submitted; should this condition occur, subsequently, with the interposition of the resilient means and of the monodirectional device, there results the motion of the driven member; or:

(b) The balance between the moment of rotation caused by the reaction of the resilient means, and the actual value of the resistant moment developed by the resistant member, is not realized or it is only realized when, due to the proportions and arrangements of the various parts, the greatest possible deformation of the resilient means is attained; should this condition materialize, all the work accomplished by the driving moment is absorbed by the deformation of the interposed resilient member (without the driven member receiving any useful effect); the selection of a suitable motor, permits, in this case, the partial recovery of the stored energy in the resilient means in the form of work of deformation.

In accordance with the foregoing conceptions, it is possible to realize various constructional forms of the reduction gear; let us consider one of the simplest forms, i. e. the one possessing an only driven member which, as aforesaid, has only a possible direction of motion owing to the monodirectional device.

If it is desired to make this direction invertible, at will, it is sufficient to maintain the housing case of the reduction gear stationary, to utilize as driving member always the same driven member and to act in a convenient manner on the said monodirectional device (for instance, by inverting the pawl and its direction of action, by modifying the direction of the friction shoes, etc. etc.); however, it will also be possible to adopt means (to be put or not in action) for the fixing of the one of the two members of the monodirectional device that is connected to the driven member previously referred to, and to utilize, instead, as such, the armature of the device that previously had been considered fixed and that now, however, will be made turnable around the axis of the reduction gear. Finally, a device is considered which is fitted with two driven members, the direction of the rotation of the driving member being constant, and if it is desired that the second member driven by the reduction gear rotate in a given direction (clockwise or anti-clockwise direction) or remain fixed, at will, while the first driven member revolves continuously (as specified above) in a sole direction (which is in relation to the monodirectional device), then, without altering what has been indicated for the first driven member, it is possible to render the said second driven member integral with the end wheel of an epicycloidal gearing, said end wheel being actuated by the eccentric device above referred to, the train carrying arm of the epicycloidal gearing being constituted by the eccentric radius of the eccentric plate, while the intermediate wheel is bound to the motions of the monodirectional device. Further, considering a device provided either with a pair of members any one of which is blocked while the other is set in rotation with a constant direction, and in addition to the above with a third driven member which, at will, can revolve in a direction or in the other or held firm, there are, also for this, in relation to the driven members, the same conditions as those previously indicated.

Finally if, on such assumption and maintaining fixed the member considered as such instead of leaving free the said other members, one of them is submitted to uniform resistant couple (for instance, to the action exerted by a brake), then the second free driven member modifies its conditions of working in relation to the braking action.

Figure 2:
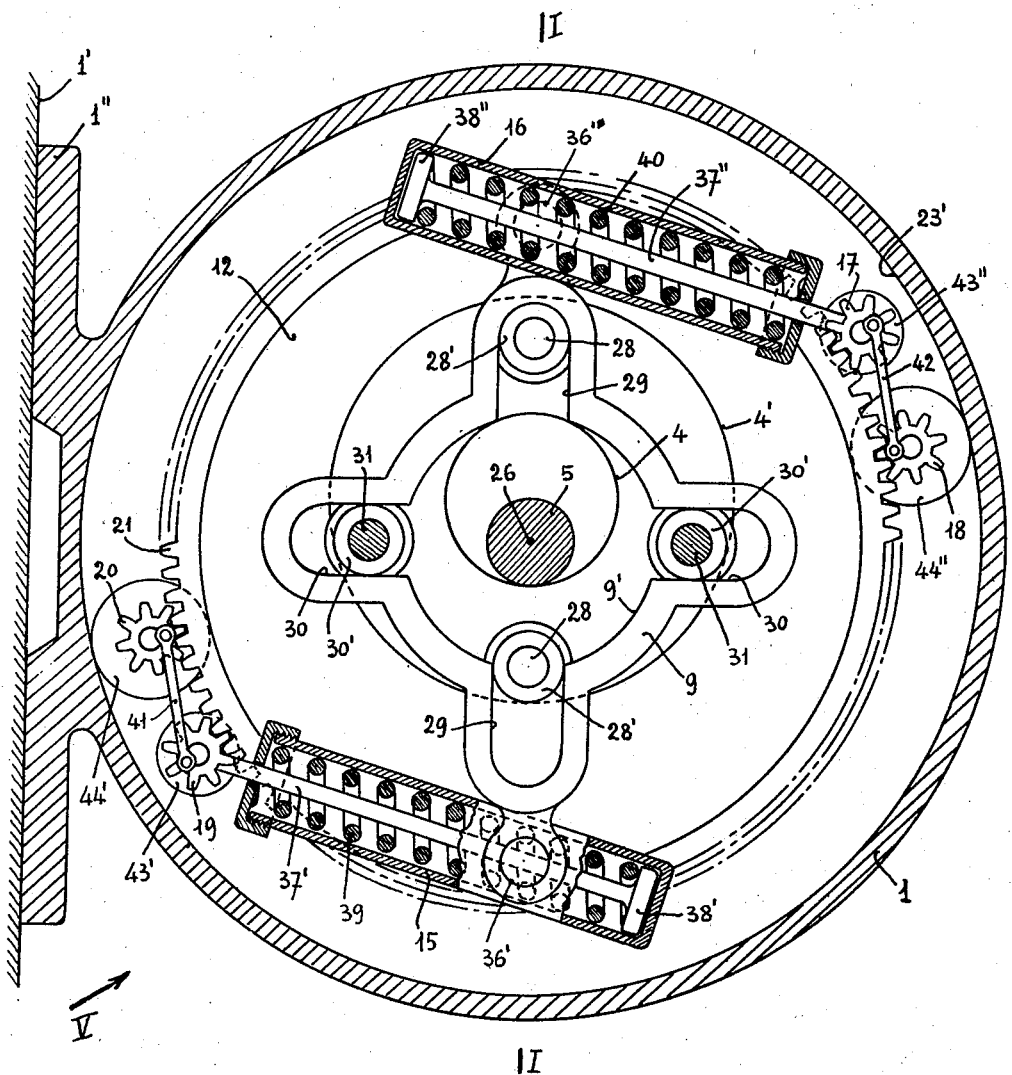
Figure 3:
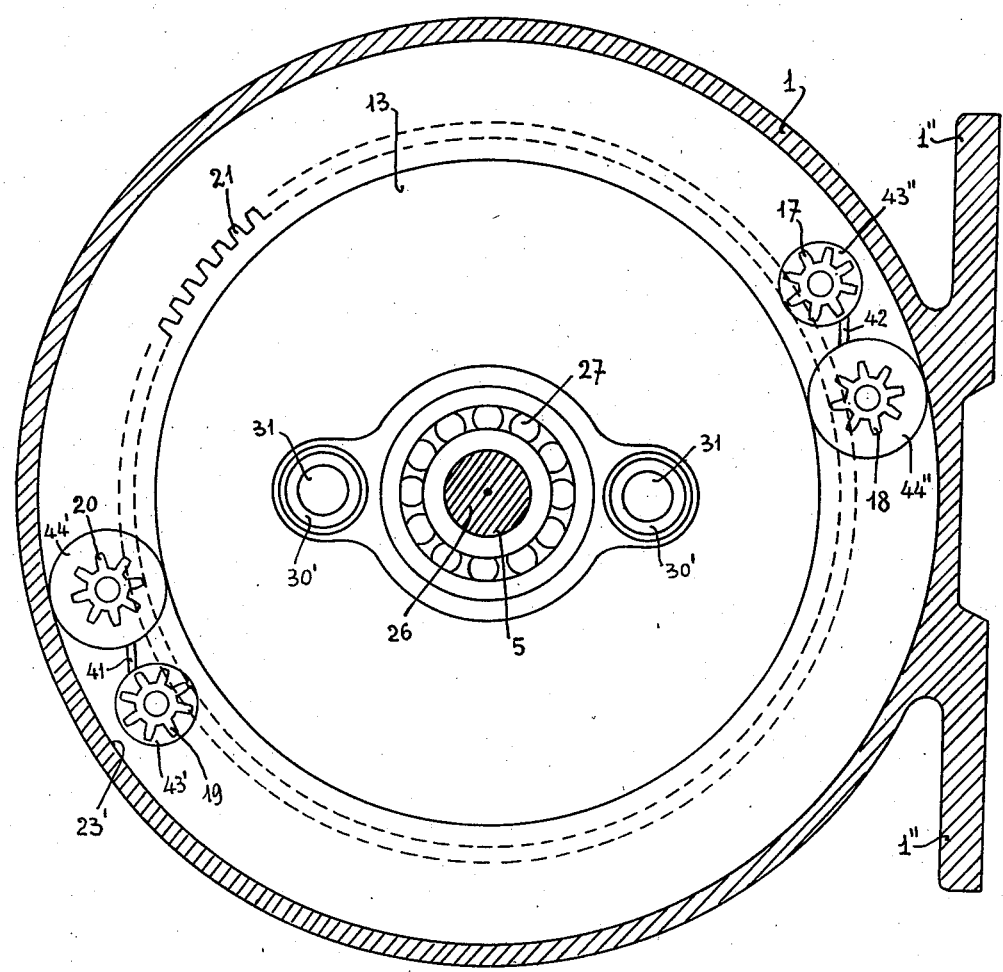
Figure 8:
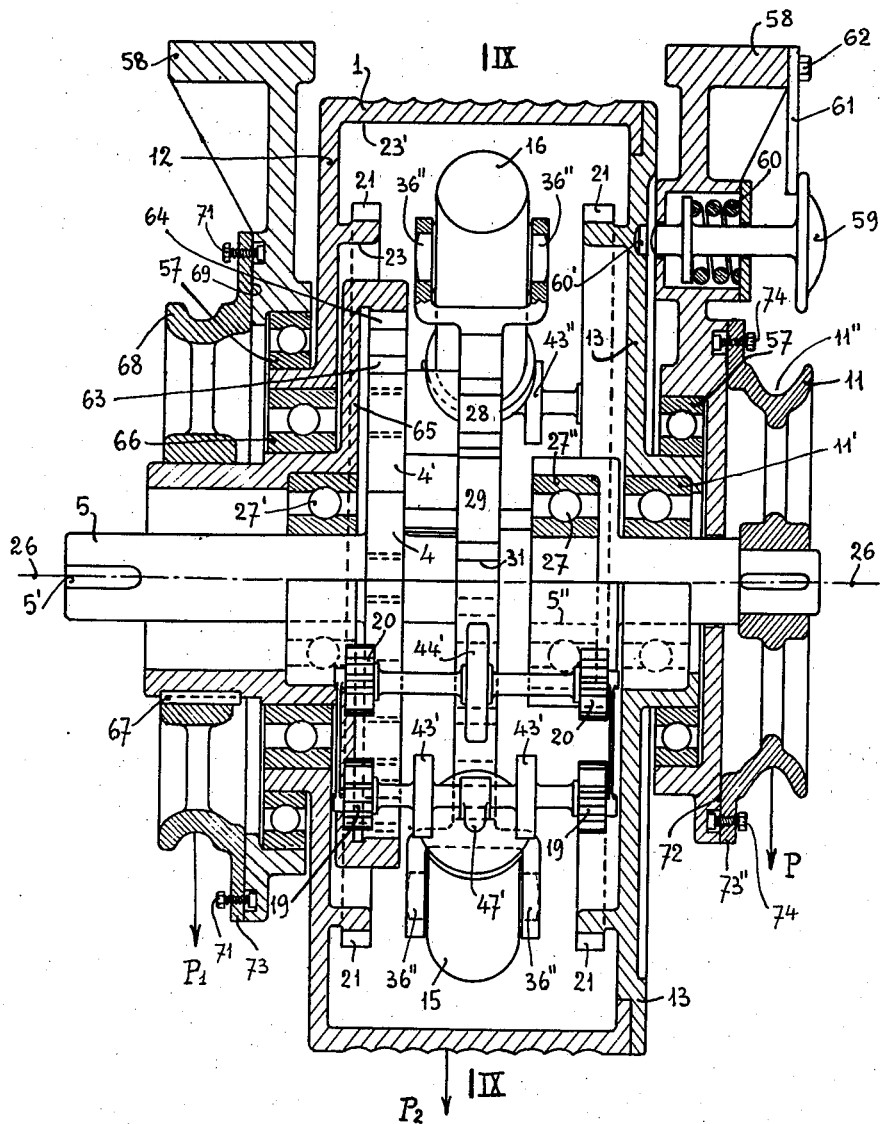
Figure 9:
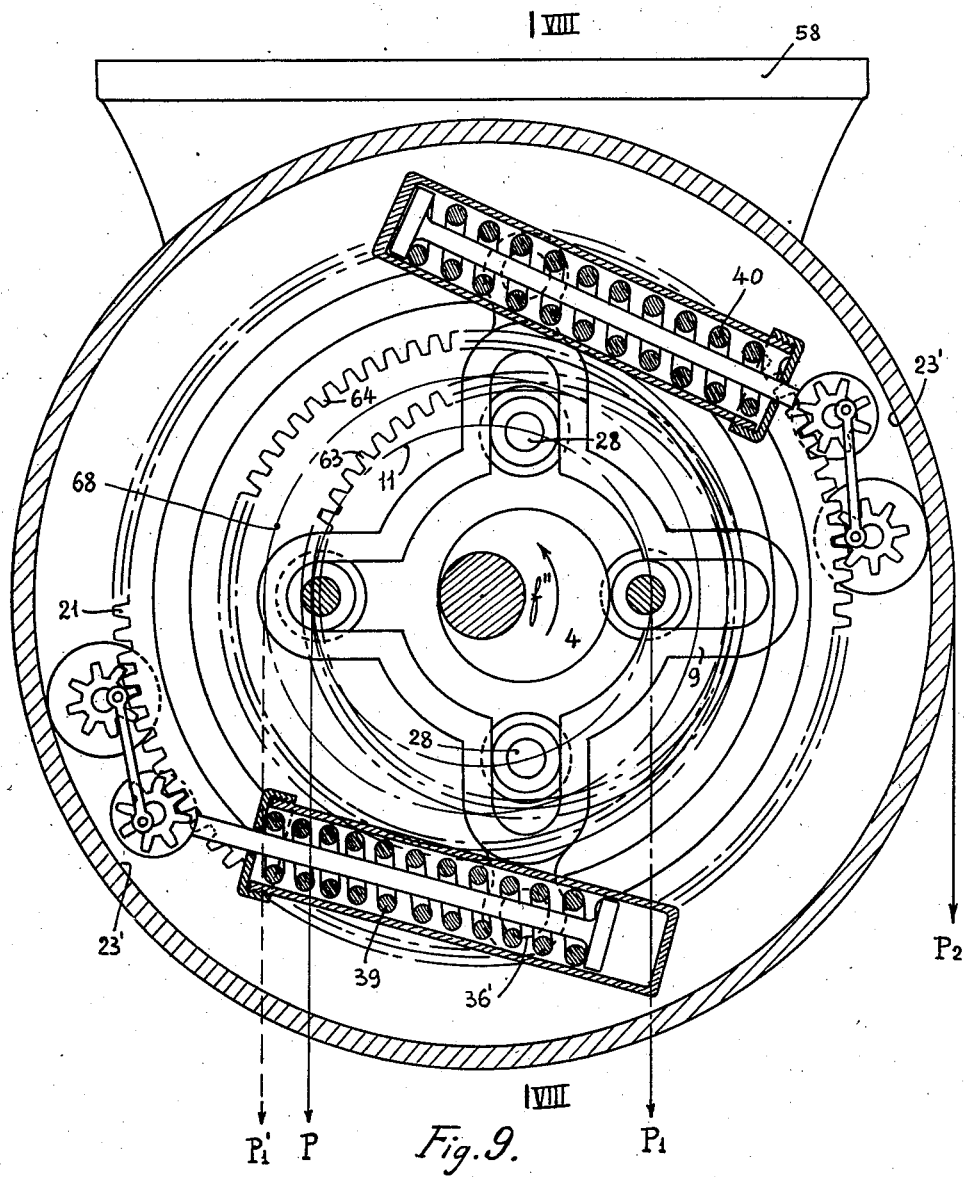

The accompanying drawings illustrate only by way of example, some practical embodiments of the invention and particularly Fig. 1 shows an axial vertical section (I—I of Fig. 2), Fig. 2 a section (II—II of Fig. 1) which is normal to the preceding, and Fig. 3 a section (III—III of Fig. 1) of the apparatus; Fig. 4 shows schematically and on larger scale, the constitution and the arrangement of a part of the indirectional device (partial view in the direction of the arrows IV), and Fig. 5 shows a partial plan thereof (in the direction of the arrows V of Figs. 4 and 2); Figs. 6 and 7 show, analogously to Fig. 2, two successive positions of the members of the reduction gear during the operation. Figs. 8 and 9 show in axial section (VIII—VIII of Fig. 9) and in normal section to the axis (IX—IX of Fig. 8) a modification of the reduction gear previously illustrated. Fig. 10 shows a different position of the gears illustrated in Fig. 4.

Referring particularly to the embodiment illustrated in Figs. 1 to 7 of the annexed drawings, (1) denotes the general casing of the reduction gear, which casing, in the exemplified embodiment, is considered fixed and applied, for instance, to a wall (1') by means of the feet (1''). A cylindrical projection (23), coaxial to the main axis (26) of the reduction gear and carried, in the embodiment in question, by the bottom (12), constitutes the support for a fixed toothed crown (21) which, as hereinafter illustrated, belongs to the monodirectional device of the reduction gear. For the sole purpose of obtaining a balanced unit of strains relatively to the plane II—II (Fig. 1), the fixed teeth are arranged in two portions (21—21), one to the right and the other to the left of said middle plane; the first portion is carried by the bottom (12), while the second portion of said teeth is carried by the removable cover (13) of the device.

The shaft (5), which constitutes the driving member of the reduction gear, is rotatably mounted by means of the bearings (27) and (27'); the former of these bearings is carried, indirectly, by the cover (13), while the latter is carried by the bottom (12) of the casing (1); the shaft (5) receives the motion of rotation through any suitable means, for instance by means of a member mounted hereon and connected with a key (5').

The reduction gear is fitted with two pins (28) (the axis of each of which is parallel to the axis (26)), which through any suitable means must receive a motion of rotation around the axis (26), according to a circumference eccentric to said axis. For this purpose, in the exemplified embodiment an eccentric (4) is applied on the shaft (5) and the two pins (28) are arranged on a diameter of a disc (4') mounted on the eccentric (4); their free ends are housed (through suitable bushings or ball bearings (28'')) within radial slots (29) (of suitable length), of a disc or plate or cross slotted member (9), located on a plane normal to the axis (26) but free relatively to the shaft (5), due to a large central aperture (9') adapted to allow the cross slotted member (9) to accomplish all the movements hereinafter referred to. The cross slotted member or crosshead (9) is formed with two additional slots (30) transversely of the direction according to which are arranged the two slots (29) above mentioned. Within the slots (30) (also in this case with the interposition of bushings or of ball bearings (30')) are housed the pins (31) which are (indirectly) integral with a disc or pulley (11) and located in correspondence to one of the diameters of the latter; the disc (11) is coaxial to the shaft (5) and is loosely mounted on the cover (13) by means of the ball bearing (11'); said disc is formed with a bell extension (27'') by means of which it supports, through the bearing (27), the inner pin (5'') of the shaft (5). In the exemplified embodiment the disc or pulley (11) has the form of a pulley with the groove (11''), and this in order to schematically indicate that on it, which is considered as a driven member, a cable can be applied at the end of which is attached the weight P that must be lifted and that constitutes the external resistance.

At two opposite points of the cross grooved member or disc crosshead (9) (Figs. 1 and 2) are applied, with the pins (36' and 36'') and free to rotate around them, the cylinders (15) and (16) which contain in their interior the springs (39) and (40) that are compressed between the bottom of said cylinders and a collar (38' and 38'') connected to an axis (37', 37'') passing through the bottom of the cylinder and formed at its outer end with a connection by means of which each rod (37', 37'') supports pinions 19 co-operating with the teeth (21). (For the same reasons of balancing as those referred to, each pinion is double, one half meshing with the teeth (21) carried by the bottom (12) and the other half meshing with the teeth (21) carried by the cover (13)).

Referring particularly to Figs. 4 and 5 showing that what relates to the rod (37') also relates to the rod (37'') and is identical with what will be described in connection with the rod (37'), it will be seen that such rod ends with an eyelet (47') wherein a transverse shaft is mounted which brings the two pinions (19) in engagement with the two fixed toothed crowns (21) and rollers (43') of such a diameter that, when the pinions (19) are in mesh with the crowns (21) (as illustrated in Fig. 4), the edge of the rollers (43') is spaced from the cylindrical inner surface (23') of the casing (1), whereas, when the edge of the rollers (43') is brought in contact with and to roll over the cylindrical inner surface 23 of the casing (1), the pinions (19) are no longer in mesh with the toothed crowns (21). Each rod (37', 37'') further actuates, indirectly, a second pinion (18—20) (each pinion provided in double for the balancing reasons above referred to), meshing with the fixed toothed crowns (21). Either the axes of the pinions (17) or that of the pinions (20) are fitted with a roller (44'—44'') which is so dimensioned that it is always in contact with the cylindrical inner surface (23') of the casing (1) and that rolls on same. A connecting rod (42—41) connects the points of the couples (17—18) and (19—20) of corresponding wheels located on two radii oppositely directed (i. e. in such a manner that each connecting rod (41—42) constitutes together with the radii passing through said points, an intertwined parallelogram).

The foregoing constitutes, in the exemplified embodiment, the mechanical realization of the monodirectional device.

The operation of the reduction gear (Figs. 1 to 7) is as follows:

Initially (Fig. 2), when no external load is applied to the device, the two springs (39 and 40) are completely unloaded within the cylinders (15) and (16). On the member (11) a cable is applied at the depending end of which there is the load P to be lifted. When the load P is applied, it, through the member (which accomplishes a slight rotation α Fig. 6), the members (9, 36'—31—30'), the guides (30), the members (9, 36' and 36''—37' and 37''—38' and 38''), compresses the springs (39—40) (which are assumed to be equal to each other) that react on the collars (38'—38'') inasmuch as the rods (37'—37') cannot move along their axis owing to the monodirectional device (17—20), etc.; the two springs (39—40) (assumed to be equal to each other) will be equally compressed and to the extent necessary until their reactions develop, relatively to the axis (26), a moment which balances the moment of the load P around the same axis (26).

The driving means (for instance, an electric motor, a jack lever, etc.) subsequently gives the shaft (5) a rotation (continuous or shockwise and periodical) in the direction of the arrow (f) (Fig. 7) (it is however to be noted since now that the working of the member (11) would not be modified were the direction of rotation of the shaft 5 alternate). Owing to said rotation, the eccentricity radius of the eccentric (4) rotates in the same direction as that of the shaft (5) of a given angle around the axis (26). The pins (28) will describe curved lines around the axis (26) and the disc or cross grooved member (9) formed with the slots (29) wherewith mesh the pins (28) and formed with the slots (30) wherewith mesh the pins (31) of the disc (11), is therefore compelled to shift, parallelly to itself, towards the right of Fig. 2, passing from the position of Fig. 6 to that of Fig. 7, so as to further compress the spring (39) (inasmuch as, the rod 37' cannot displace itself, as hereinafter explained) and to thoroughly slacken the spring (40) (inasmuch as, also the rod 37'' for the moment cannot shift, as hereinafter explained. Thus the position of the parts illustrated Fig. 7 is attained. A further rotation of the shaft (5) and of the eccentric disc (4) around the axis (26) in the direction of the arrow (f), sets up a rotation of the element (9) around one of the pins (36') or (36''); in the case and on the assumptions illustrated in Figs. 6 and 7, said rotation takes place around the pin (36') which is fixed and acts (except for secondary moments) as momentary pin of rotation for the cross grooved member (9); this rotation of the element (9) around (36') causes the rollers or pinions (17) to withdraw from the teeth (21) and the rollers (43'') to come in contact with the rolling cylindrical inner surface (23') of the case (1). Only then, can also the cylinder (16), under the action transmitted to it by the motor through (5—4—28—9—36''—37'') and due to the rotation of the element (9) around (36'), rotate around (36') thus causing the roller or pinion (18) to roll on (21) and the rollers (43'') and (44'') to roll on the cylindrical inner surface (23') of the casing (1); the advancement in the direction of the arrow (f') takes place for an angular amplitude β which, as a rule, has a value that is in inverse relation to the entity of the load P to be lifted, and therefore also in inverse relation to the initial compression (Fig. 6) of the two springs (39 and 40). This motion takes place for an amplitude β (Fig. 7), i. e. as long as the radius of eccentricity of the disc (4) sets in horizontal direction, i. e. until the element (9) has moved at the utmost towards the right (Figs. 2 and 6), and until the elements (28) have assumed their position of greatest displacement towards the right (Figs. 2 and 6). The pin (36') however, is not perfectly fixed (as indicated above) at its position, but it, owing to the eccentricity of the element (9), accomplishes a slight rotation around the axis (26), this rotation being caused by the applied resistant couple.

Hereinbefore it has been said that the rod (37') could not displace under the reaction of the spring (39), which has permitted the further compression of said spring; to determine the exactness of such affirmation, it may be pointed out that the stress of tension exerted by the member (9) on the rod (37'), which is provided with the disc (38'), reaches, through the cylinder (15) and the spring (39), the eyelet (47') carrying the system of wheels (19—43') and actuating the wheels (20) through the connecting rods (41); as both these wheels (19 and 20) engage with (21) and are, moreover, connected by the connecting rod (41) in such a manner as to be permitted of accomplishing only inverse rotations, it follows that, as long as such gears (19—20) mesh with the teeth (21), they cannot roll on the teeth (21) and therefore the rod (37') shall not be permitted to shift in axial direction, as it had been stated.

At the end of the considered cycle of working, i. e. when the indicated movable parts are in a position that is displaced of an angle β relatively to the position illustrated in Fig. 7, the spring (40) is thoroughly slackened, the spring (39) is compressed, the pinions (17) are not in mesh with the crown wheels (21), and the whole (17—18—42) is not blocked on the crown wheels (21) while the whole (19—20—41) continues to be in engagement with the teeth (21). If the rotation of the shaft (5) continues in the direction of the arrow (f), what has been previously said in connection with the lower and upper members takes place again—always in the direction of the arrow (f)—in an identical manner for the upper members, and respectively lower members; in other terms, the element (9) initially will move somewhat towards the left (Fig. 7) thus returning the pinion (17) in mesh with the crown wheel (21) and partially unloading the spring (39) and partially compressing the spring (40); as the rotation of the shaft (5) continues, the spring (40) will be more and more compressed, while the spring (39) is more and more slackened until the radius of eccentricity of the eccentric (4) is on the vertical line; due to this position of the eccentricity radius, the two springs (39—40) are equally compressed; as the rotation of the shaft (5) is still continuing in the direction of the arrow (f), the spring (40) results more and more compressed and the spring (39) less and less compressed, until all the external load is applied to the spring (40) which is compressed at the maximum, while the spring (39) is thoroughly slackened; at this moment the pin (36") remains fixed in the position assumed, and the element (9) will rotate around it until the wheel (19) is withdrawn from the teeth (21) and the roller (43') connected thereto is brought in contact by its edge with the cylindrical inner surface (23') of the case (1) and then to roll, always according to (f'), on said surface while the gear (20) rolls on the crown wheel (21); the amplitude of the angle of such rolling is, as said before for the angle β, generally of a value which is in inverse relation to the entity of the load P to be lifted.

These workings, i. e. the subsequent rotations around (36', 36", ...) and the rollings (for the amplitude β) on (21) subsequently of the groups (17, 18), (19, 20), (17, 18), (19, 20) ... lead to subsequent rotations (always in the direction of the arrow f') by the element (11) and therefore to the lifting of the load P. The subsequent displacements (subsequent and equal to each other) of the load P are as small as the value of such load is high.

If the axis (5), after having reached the position owing to which the pins (28) are displaced at the utmost towards the right, i. e. if the axis (5) after having accomplished a rotation β beyond the position illustrated in Figure 7, inverts its direction of rotation and rotates in the opposite direction from that of the arrow f, all the movements have stopped which have been previously mentioned when the shaft (5) continues rotating in the direction of the arrow (f).

If, owing to a too high value of P, the initial compression of the two springs (39) and (40), and subsequently the further compression of one of these springs is so high as to consume, for the greatest possible compression of one of the springs, all the energy supplied during the motion of rotation of 180° of the eccentric, and therefore if there not remain the availableness (during the rotation β of the eccentric 4) of the said subsequent rotation of the element (9) around (36') or (36"), for what is necessary to obtain the withdrawings of the pinions (17) and (19) from the teeth (21), said disengagement will not take place, as will not take place the useful rotation of the pulley (11) for the lifting of the load P, and all the work effected by the motor will be absorbed, initially, in the deformation work for the springs and subsequently partially back given (returned) by the elastic members should the motor be of the type for the recovery of the energy.

From the foregoing it follows that the device just described, when operated by a driving device of sufficient power, gives the member (11) a succession of motions of rotation β which are decreasing in ampltiude as the value P tangentially applied to the primitive of the member (11) is increasing in value; i. e. the device modifies automatically (one inversely to the other) the two factors (force and space covered from the point of application of the force) of the expression of the resistant power, automatically adapting the value of the latter to that of the former.

The same device can, however, offer other different and improved utilizations, by exploiting methods of the mechanics known by themselves.

In the foregoing specification the outer casing (1), which was fitted with the feet (1"), has been considered fixed, and the pulley (11) constituted the driven member; obviously, it would be possible to realize a device like the one described, in which, however, the casing (1), drum shaped, is arranged free to rotate around the axis (26) while the shaft of the pulley (11) is kept steady; in this case the drum-casing (1) will accomplish the same motions as those previously described in connection with the pulley (11), but, whatever the direction of rotation of the shaft (5) may be, the direction of rotation of the drum casing (1) will be opposite from that indicated for the pulley (11), inasmuch, as the direction of rotation of the drum casing (1) is regulated (as previously that of the pulley, (11), by the unidirectional device described.

In the Figures 8 and 9, there is such device which is however fitted with a further driven member (68). The casing (1) is suspended by means of the supports (57) and the connection feet (58) so that also it can revolve around the geometrical axis (26—26), while it can be prevented from rotating by means of the pin (59) pushed by the spring (60) against the side (12) or the cover (13), so as to engage with notches (60'); a plate (61) revolving around a screw pin (62) can be located, as indicated in Fig. 8, laterally to the head of the pin (59) so as to hold the latter withdrawn from the notches (60') and to leave therefore the drum-casing (1) free to rotate around the axis (26).

The reference numbers of Figs. 8 and 9 are, as far as possible, the same as those adopted in the Figs. 1 to 7.

The cylindrical outer surface of the outer casing (1) is so arranged that it can be utilized, for instance, as a drum for the lifting of a load $P_2$; the plate (4'), mounted on the eccentric (4) is provided, on its cylindrical periphery, with teeth (63), while a crown wheel (64) is carried by a disc (65) which is mounted in alignment with the axis (26) by means of the bearing (27') and which, on its turn, supports, by means of the bearing (66), the hub of the drum-cylinder or casing (1). A pulley (68) is mounted, by means of the key (67), on the extension of the disc (64) projecting from the drum-casing (1). The crown wheel (64), the disc (4') toothed at (63), the eccentricity and the diameter of the plate (4) are assumed in such a manner that the teeth (63) and (64) engage with each other and form, together with the aforesaid members, an epicycloidal gearing, the train carrying arm of which is constituted by the eccentricity radius of the plate (4).

A flexible member, at the end of which a load $P_1$ is applied, is assumed to be straddled on the pulley (68); the latter presents one of its edges prolonged in the shape of or is connected with a disc extending before the surface (69) of the support of the left hand bearing (57). In correspondence to said surface, there are provided means, such as (and schematically shown) friction shoes operated by the screw (71), by means of which the pulley (68) can be rendered free to rotate around the axis (26), or partially or totally braked, relatively to the fixed portion. Accordingly the pulley (11) presents one of its edges prolonged in the shape of or connected with a disc (73) extending before the surface (72) of the support of the right-hand bearing (57), and means, such as friction shoes, shown diagrammatically, operated by screw (74) are provided which by means of the pulley (11) can be rendered free to rotate around the axis (26) or partially or totally braked, relatively to the fixed position.

The device disclosed in the Figs. 8 to 11 can operate in various manners, two of which are particularly useful and are hereinafter described.

First way of operation of the device (Figs. 8 to 9).

The drum-casing (1) will be blocked, owing to the engagement by the pin (59) with the notches (60') under the action of the spring (60), while the two pulleys (11) and (68) are free to rotate due to the slackening of the screws (74) and (71).

The working of the device is the following: As regards the pulley (11) and the members interposed between the shaft (5) and the pulley itself, what has been said with reference to the Figs. 1 to 7 holds good; as to the pulley (68), it is to be observed that the eccentric (4) and the shaft (5) must revolve in the direction of the arrow (f'') in order to lift the weight $P_1$ and the weight P, whereas, when they revolve in opposite directions, the weight $P_1$ descends and the weight P continues to be left.

When the shaft (5) and the eccentric (4) rotate according to (f''), there results that, while the cross grooved member (9) accomplishes the motions previously described with reference to the Figures 1 to 7, the disc (4') receives, relatively to the eccentric (4), a direction of rotation opposite from that of the arrow (f''), while it is driven around the axis (26) in the direction of the arrow (f'') by said eccentric. Consequently the crown wheel (64) turns in the direction of the arrow (f''), thus lifting the load P.

Using the device with the drum (1) fixed and the pulleys (11) and (68) free, as indicated just now, the two loads P and $P_1$ exert opposite moments on the cross grooved member (9) and the difference of such moments (which is less than the moment of the load P) will load the two springs (39) and (40) to a lesser extent than in the case illustrated in the Figs. 1 to 7, and consequently the value of the angle $\beta$ (Fig. 7) will result increased in relation to the dimensions of the parts, so that the device is adapted to function also with greater loads.

From the foregoing it follows:

(a) That the actions exerted on the loads P and $P_1$ are connected;

(b) That the actions exerted on the load P (i. e. the displacements that are given to the load P) are always inversely proportional to the value of the load P;

(c) That there is a value of the load P above which the load P itself is not further lifted (and this for the working explained with reference to Figs. 1 to 7).

Therefore it may be deducted that, starting from said maximum value—possible for the working—for the load P, maintaining the load $P_1$ constant, and diminishing gradually the value of the load P, there result subsequently the following characteristics:

The load P is steady while the load $P_1$ is lifted with the maximum speed;

As the load P diminishes, it is lifted with a gradually increasing speed, while the load $P_1$ is lifted with a gradually decreasing speed;

A determinated value of the load P is reached for which while the load P continues being lifted, the load $P_1$ is no longer lifted;

Finally, if the load P is still diminished below said last value, then, while it continues being lifted with an ever increasing speed, the load $P_1$ descends thus co-operating, with its driving couple and together with the motor, to set the shaft (5) into motion of rotation and to lift the load P.

Obviously if, instead of maintaining the value of the load $P_1$ steady and of diminishing the value of the load P, the value of the load P had been maintained steady and the value of the load $P_1$ had been increased, the same conditions of working as those specified above would have been attained.

In other terms, the apparatus of Figs. 8 and 9 consists of two parts: the right hand part (Fig. 8) corresponding to the apparatus of the Figs. 1 to 7 and the added portion, that of the left hand (Figs. 8 and 9). This combination leads to the result that, due to a suitable determination of the value of the load $P_1$, it is possible to graduate the device and particularly the portion controlling the pulley (11) (i. e. the right hand portion of Fig. 8) in such a manner as to realize a very considerable lifting of loads P. In this connection, it must be remembered, that the angle $\beta$ of useful rotation (Fig. 7) (whereto the lifting of the load P corresponds) can be made as little as desired through suitable regulations.

Second manner of working of the device (Figs. 8 and 9).

The disc (11) be unloaded (P=zero) and locked through the tightening of the screws (74);

the drum (1) be free to rotate due to the withdrawing of the pin (59) from the notches (60') and loaded by the load P₂; the pulley (68) be free to rotate thanks to the slackening of the screws (71) and be loaded by the load P₁'.

As, owing to the monodirectional device, the drum (1) can rotate only in the direction (f''), which is inverse to that according to which the disc (11) revolves, it is necessary that the load P₂ should be applied to the drum (1) in the manner indicated in Fig. 9; further, in order to get, with regard to the springs and for the purposes of adjustment of the angle β the partial compensation of the moment of the load P₂ on the part of the moment of the load P₁', it is also necessary that the load P₁' applied to the pulley (68) should have the direction and the sense indicated in Fig. 9; finally (in order to obtain the lifting of the loads P₂ and P₁') the direction of rotation of the shaft (5) should be inverse to that of the arrow f''.

The working is identical with that described above in connection with the first way of operation; it is sufficient to substitute for the signs P and P₁ of the specification relating to the first way of operation, the signs P₂ and P₁'.

The two methods of working aforesaid may set up two variants of constitution and operation. And particularly the member capable of rotating in a sole direction (i. e. the pulley (11) in the first way of example and of operation, and the drum (1) in the second way of operation) and to which was applied the load that had to be lifted in any case (i. e. the load or the load P₂ respectively) may be submitted to a braking action (for instance, by means of the pressure screws (74) or of the pin (59) actuating suitable braking shoes), which corresponds to increase the value of the load (P or P₂) applied thereto; this causes, as previously indicated, a variation in the lifting speed for the load P₁ or P₁' applied to the pulley (68) to such an extent as to realize even the reversal of the rotation of said pulley (68) without the rotation of the shaft (5) having to be varied.

The described reduction gears, instead of being provided with a sole unit constituted by an oscillating plate (9) with the pins (36') and (36'') and associated members, an eccentric (4) and a disc (4') mounted thereon, may be provided with more (for instance with three) assemblies of such groups of elements, the various assemblies being uniformly displaced in relation to each other, thus obtaining a greater regularity for the transmission of the motion of rotation.

The elastic elements, which have been represented as springs may be replaced, in determinate applications, by elastic fluids and the monodirectional device constituted by the coils (17—20), by the connecting rods (41) and (42) and by the rollers (43', 43'', 44' and 44'') may be modified in any way whatever that be capable of realizing the same results as those previously specified.

The automatic reducing device indicated above can be used for various cases due to suitable circumspections; for instance, in general it may be inserted between a driving member and a resistant member whatever, such as in a vehicle, in a machine, in a braking device etc. etc.

It will be evident that many modifications can be adopted for the realization of the invention, all these modifications being however based on the conceptions of the invention as set forth in the following claims.

Having now described my invention and illustrated its use and working, what I claim and desire to secure by Letters Patent, is the following:

1. In a reduction gear adapted to be interposed between a driving member and a resistance member in order to transmit the motion from the former to the latter automatically in variable relation to the variations presented by the resistance, the combination of a driving member rotatable around a geometrical axis, an eccentric device assembled on said driving member, an intermediate oscillating member operated by the eccentric device to accomplish alternate motions, motion limiting elements adapted to reduce the extent of motion of the intermediate oscillating member, an intermediate mono-directional device, one of the parts of said mono-directional device being operated by said intermediate oscillating member, and the other part being operated by the members next in the cinematic chain, an elastic member, preferably adjustable, interposed between said mono-directional device and the other members of the cinematic chain, a driven member suitably connected to one of the parts of the said mono-directional device adapted to be rotated in a predetermined direction by means of said device, and a retaining means capable of preventing the rearward motion of the driven member, said device not acting on the driven member itself for transmitting the motion thereto.

2. In a reduction gear in accordance with claim 1, an additional driven member adapted to be controlled by the action of said mono-directional device.

3. In a reduction gear in accordance with claim 1, in which the resistance, dimensions and arrangement of the elastic member are such that the applied loads are prevented from exploiting the elasticity of the elastic member.

4. A reduction gear comprising a stationary housing, a driving member and a driven member revolubly and coaxially mounted in said housing, a cam element on said driving member, a crosshead having guide slots spaced 90° apart in radial direction, a disc member engaging the cam element and provided with two pins secured diametrically opposite each other on said disc element and adapted to engage corresponding guides of said crosshead, two other pins fixed on said driven member adapted to engage corresponding grooves in said crosshead at right angles to said first two pins, yieldable elements pivoted at diametrically opposite points on said crosshead, pinions having permanent connection with said yielding elements, a circular disc on each of said pinions, a cylindrical flange in said housing concentric with sad driving shaft and provided with external teeth and adjacent cylindrical paths, said teeth and path being adapted to engage alternately with said pinions and paths respectively, whereby power from said driving member is intermittently transferred to said driven member according to the resistance set up by the driven member.

5. A reduction gear in accordance with claim 4, additional driven members revolubly mounted in said housing and means actuated by said driving member to selectively operate said additional driven members.

CESARE FONTANA.